(12) United States Patent
Talagala (10) Patent No.: US 6,928,518 B2
(45) Date of Patent: Aug. 9, 2005

(54) DISK DRIVE EMPLOYING ADAPTIVE FLUSHING OF A WRITE CACHE

(75) Inventor: Nisha D. Talagala, Fremont, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 610 days.

(21) Appl. No.: 10/003,660

(22) Filed: Nov. 1, 2001

(65) Prior Publication Data

US 2003/0084252 A1 May 1, 2003

(51) Int. Cl.$^7$ .............................................. G06F 12/00
(52) U.S. Cl. ....................... 711/135; 711/143; 711/159
(58) Field of Search ................................ 711/135, 143, 711/159

(56) References Cited

U.S. PATENT DOCUMENTS

| | | | |
|---|---|---|---|
| 5,524,234 A | * 6/1996 | Martinez et al. ............. | 711/141 |
| 5,568,291 A | 10/1996 | Murata et al. ................. | 359/67 |
| 5,584,009 A | * 12/1996 | Garibay et al. .............. | 711/117 |
| 5,586,248 A | 12/1996 | Alexander et al. ......... | 395/182.2 |
| 5,586,291 A | 12/1996 | Lasker et al. | |
| 5,664,149 A | * 9/1997 | Martinez et al. ............. | 711/141 |
| 5,860,111 A | * 1/1999 | Martinez et al. ............. | 711/143 |
| 6,044,478 A | * 3/2000 | Green .......................... | 714/42 |

* cited by examiner

Primary Examiner—Reba I. Elmore

(74) Attorney, Agent, or Firm—Blakely, Sokoloff, Taylor & Zafman LLP (57) ABSTRACT

A method embodied as software or firmware code permits the adaptation of disk drives employing write-back caching to reduce the possibility of lost data from the write cache. In one embodiment, the method is integrated with the host operating system software employed by a host computer coupled to the disk drive. The method issues write requests to the disk drive as it receives them from the applications running on the host computer. The disk drive processes the issued requests as it is designed to, using write-back caching techniques. After each request is cached, the disk drive controller acknowledges the write request back to the host. The host delays communicating the acknowledgements back to their originating applications until the data has been actually written to the disk media. Because write-back caching does not commit cached requests to disk on a regular basis, the host software simply forces the disk drive to execute cached write requests on a regular basis using a CACHE_FLUSH command. The disk drive employs standard throughput optimization techniques to reduce the overall latency of the disk accesses. When the rate of the request stream is low, the host simply issues a flush command after issuing each write request to the drive. As the rate of the request stream increases, the host lets the requests pool in the cache rather than at the host. It then issues a flush command when the pool size reaches a number where the incremental reduction in throughput to the disk media during the flush no longer offsets the incremental increase in request latency due to the pooling time. When the flush is complete, the disk drive notifies the host, and the host releases the acknowledgements of all of the pooled requests to their originating applications.

37 Claims, 5 Drawing Sheets

DISK DRIVE EMPLOYING ADAPTIVE FLUSHING OF A WRITE CACHE

BACKGROUND OF THE INVENTION

1. Field of the Invention

The present invention relates to disk drives, and more particularly to the use of write-back caching while maintaining data integrity.

2. Description of the Related Art

In most computer systems today, the host computer's interaction with the one or more disk drives of a memory subsystem is often the greatest factor limiting the speed performance of the system. While processors in the host computer continue to operate at ever increasing speeds, improvements in the time required for the host to access a disk drive during a read or write operation (i.e. latency) have not kept pace. Thus, as the speed of available microprocessors in the host computer has increased the latency of I/O operations between the host and the memory subsystem has become the predominant performance issue.

A number of techniques have been employed in disk drives to decrease latency and increase throughput to disk storage. One such technique uses cache memory to store memory operations requested of the disk drive by the host computer. Cache memory is typically volatile random-access memory (RAM) located proximately with the disk drive(s) of the memory subsystem. In a write-through caching scheme, execution of a write command received from the host results in the data and disk target address specified by the command being stored into the write cache in addition to the data being written onto a disk at the target disk address. Read operations are also typically cached in a similar manner, with the data and disk addresses cached as data is read from the disk and supplied to the host. The read cache can be separate from or integrated with the write cache.

A disk drive controller located in the disk drive keeps track of the various disk addresses for which the disk storage media of the disk drive holds accurate data in the write cache. If the host subsequently issues a read operation that requires data to be read from one of the cached disk addresses, the disk drive controller verifies whether accurate data for that location is stored in the cache (a cache hit). For every cache hit, the disk drive can forego an access to the disk media in favor of a much faster access to the cache. Of course, the latency for the read operation is not improved when the data for the corresponding read address is not in the cache (a cache miss). Nor is latency improved for the write operation in a write-through caching scheme, as the write is not acknowledged to the host as completed until the data has been physically committed to the disk media (i.e. stored magnetically on the surface of the disk media).

A more aggressive caching technique is called write-back caching. In this approach, the data and target address for a write operation is received and written to the cache by the disk controller, but the data is not immediately written to the disk media. The cached data is typically written to the disk media at a later time under two circumstances. In one instance, the disk controller detects that the cache is full, in which case data from one or more of the cache memory locations must be written to disk to free up the cache locations for the pending write operations. In the second instance, the memory subsystem receives a CACHE_FLUSH command (typically from the host), in response to which all cached write data not yet written to the disk is flushed from the cache and written to the disk media. The most significant feature of write-back caching is that the disk controller acknowledges the completion of each write operation to the host immediately upon the write data and the target address being stored in the cache. This means that the application program running on the host computer that requested the write operation can continue execution without waiting for the data to actually be committed to the disk media. Because access to RAM is so much faster than an access to the disk (e.g. <1 ms vs. 6–7 ms respectively), forestalling the write to disk and acknowledging completion of the write to the host immediately upon caching the data significantly reduces the application's perceived latency of each write request.

One technique employed in disk drives to increase memory operation throughput of physical writes to (and reads from) the disk involves queuing and reordering the execution of pending disk operations so that those operations accessing addresses on the disk that are more proximate to one another can be executed together. This optimization process serves to minimize the mechanical latency of the accesses. Mechanical latency includes, among other factors, the time required for the read write head to be positioned over the disk location corresponding to the disk address at which the I/O operation is to occur. This includes the seek time necessary to actuate the arm carrying the read/write head to the appropriate track on the disk, as well as the time it takes for the disk to rotate until the right location on the track is under the read/write head. Write operations involving large blocks of data are typically broken down into smaller sub-operations. It is advantageous if these sub-writes can be executed sequentially and continuously with respect to one another, because data will then be stored in adjacent regions called tracks on the surface of the disk. The seek time between adjacent tracks is minimal. It is also clear that even if reads and writes are related, though they may not be sequential, processing these I/O operations based on some proximity algorithm can still minimize latency by minimizing the seek time between them.

The process of optimizing the order of pending disk accesses is generally orthogonal to the caching technique described above. The effectiveness of such optimization techniques may vary depending on the nature of the incoming I/O request stream and the manner by which the optimization scheme works with the particular caching scheme employed by the disk drive. For example, the choice of which write operation to flush from the write cache as a result of a cache miss when the cache is full can be optimized depending upon the nature of the disk operations already pending.

Write-back caching provides greatly reduced I/O latency because the disk drive acknowledges a write operation back to the host (and ultimately the application that requested it) prior to the data being physically committed to the disk media. However, significant problems will arise if something goes wrong prior to the data being stored on the disk media. For example, if power is lost, the data for all of the write operations not yet written to disk may be lost from the volatile cache memory. Or if the disk drive gets hung up, a hard reset is usually required to resume operation. A hard reset involves cycling the power and may also result in loss of data from the cache. Finally, if the write operation is interrupted in mid-write, there is generally no way to easily recover because the disk drive will not be able to tell what has been written to the disk media and what has not. Even if a means for recovering from write errors is provided, by the time such a problem is detected, the application that requested the write operation may have continued and even completed execution and as a result may no longer be active. Additionally, typical systems in used today have no mechanism for informing the application that a write error has occurred, even if the application is still running and has some way to recover from the write error.

For desktop systems, the significantly lower perceived latency achieved through write-back caching far outweighs any downside caused by the foregoing problems. Long accesses to the disk drive are quite noticeable to desktop users running typical desktop application programs. Moreover, these problems occur quite infrequently, and when they do, users usually can recover with only some minor inconvenience. An example of write-back caching in typical desktop PC applications is the Intelligent/Integrated Drive Electronics (IDE) interface between the memory subsystem and the host system. This standard has a simple interface and specifies the use of the write-back caching scheme described above, to achieve low latency.

For enterprise applications such as those storing large and valuable databases accessed over the Internet and other networks, the corruption of data that can occur using the write-back caching scheme of IDE (more properly referred to as AT Attachment (ATA) standard based) drives can be disastrous. The loss or corruption of data in enterprise applications is extremely costly, however infrequent, and as discussed above, exceedingly difficult to track down and correct. The most common interfaces employed between system hosts and memory subsystems for enterprise applications include the Small Computer System Interface Standard (SCSI) and the Fibre Channel standard. Drives built to these standards are intended to provide a high degree of data integrity, albeit at a higher cost; ATA disk drives can be as much as 2 to 3 times cheaper than SCSI drives. SCSI and Fibre Channel disk drives typically provide write-back caching.

Some SCSI drives permit the write-back caching scheme to be disabled in favor of write-through caching. This solves the problem of possible data loss, but the resulting increase in perceived latency may not be acceptable. It would be much more desirable to avoid the loss or corruption of data from the cache and still have the benefit of the reduced latency provided by employing write-back caching. One technique that has been used in an attempt to avoid the problem of data loss from the write cache during loss of power is to employ a write cache that is backed-up by battery power. While the data is preserved in the cache until power is restored, or at least as long as the batteries provide sufficient power, this technique adds cost and complexity to the system. Another known technique employs an uninterruptable power supply (UPS) in an attempt to maintain system power long enough for the cache to be flushed and all of the write requests still in the write cache to be physically completed to disk. The primary problem with this solution is the lack of certainty that the time provided by the UPS will always be sufficient for all of the cached write requests to be completed to the disk media before the power is ultimately lost. The total time required to complete any group of write requests will vary widely as a function of the number of such operations to be flushed, the physical proximity of the disk addresses being written, and whether write errors occur that slow down the completion of the cache flush.

Moreover, given the significant cost advantage of ATA drives over SCSI and Fibre Channel disk drives, it may be advantageous to employ ATA drives in enterprise storage applications. Unlike the SCSI specification, however, the ATA specification until recently did not permit even the option of providing write-back disablement. Prior to this recent change in the ATA specification, manufacturers ran the risk of non-compliance with the specification to offer such an option. Even today, adding such a feature as an option risks backward compatibility with earlier drives designed to older versions of the specification. Moreover, although the most recent ATA specification now grants manufacturers an option to provide a software command by which to disable write-back caching, it is not certain that any ATA drive manufacturer will provide such an option. ATA drives have not been designed to operate in that fashion in the past and are therefore not well characterized in a cache disabled mode of operation. Even if such a disable command is provided so that ATA drives can be more safely used in enterprise applications, the performance advantage of using write-back caching would be sacrificed.

Therefore, there is still room in the art for a method and apparatus by which ATA drives can be adapted to enterprise storage applications in a manner that does not require the drive itself to be physically altered to operate outside of its intended modes of operation, that still makes use of the write cache to improve disk drive performance, while substantially reducing the likelihood that data will be lost or corrupted.

SUMMARY OF THE INVENTION

The method of the invention processes a series of write requests originated by one or more applications running on one or more host computers coupled to a memory subsystem by pooling one or more of the write requests in a write cache of the memory subsystem in accordance with the disk drives write-back caching process. The method than delays communication of write acknowledgements as generated by the memory system for each of the write requests comprising the current pool until the data of all of the pooled requests has been written to the disk media. Thus, from the application's perspective, the disk drive is no longer operating under a write-back caching scheme and all of the problems that can occur from losing power or experiencing a write error during writes to disk are no longer of concern.

In another aspect of the invention, the series of write requests is queued and monitored to determine an appropriate maximum size of a current pool of requests as they are issued to be cached by the disk drive. When it has been determined that the appropriate number of requests now occupies the cache, one or more commands are issued to flush the cache to storage media in the memory subsystem. This cache flushing process includes storing the data of all of the write requests comprising the current pool to the disk storage media. Once all of the write requests are stored on the storage media, acknowledgements are passed to their originating applications for all of the current pool of requests.

In one embodiment, the appropriate number of write requests in the current pool is determined based on whether any other requests are pending in the queue, and if so, has some predetermined maximum pool size already been met. If the answers are "yes" and "no" respectively, a next write request is issued from the queue to be processed by the memory subsystem in accordance with its write-back caching process. If no requests are pending in the queue, or if a request is pending but the maximum pool size has been met or exceeded, the invention determines that this is the appropriate pool size and proceeds to issue the command to the disk drive to flush the cache.

In another embodiment, the appropriate number of write requests for the current pool is determined by determining in the same manner as above, but if there are no requests pending, waiting for the arrival of the next request in the queue by a predetermined interarrival time threshold. If the threshold is met or exceeded the cache is flushed, other wise this arriving request is issued for write-back caching and processing proceeds as before. In another embodiment of the invention, the predetermined maximum pool size may be exceeded if it is determined that any requests still pending in the queue are sufficiently proximate by disk address with those already part of the current pool to justify expanding the pool beyond the maximum.

In one embodiment, the disk drive employs the flushing process with which it comes programmed by the manufacturer, and preferably arranges the order in which the write requests are stored to the disk media to minimize the time required to complete all of the writes to the storage media. Once the pool of requests have all been written to the storage media, the write acknowledgements are passed on to their originating applications and the processing of new requests proceed as described.

In one embodiment, the method of the invention resides in the host computer as programming instructions. In another, the invention resides with the disk controller of the disk drive, also as programming instructions. The disk drive may be one operative under the ATA standard, or under the SCSI standard.

BRIEF DESCRIPTION OF THE DRAWINGS

The present invention may be better understood, and its numerous objectives, features and advantages made apparent to those of ordinary skill in the art by referencing the accompanying drawings. The use of the same reference number throughout the several figures designates a like or similar element.

DETAILED DESCRIPTION

Overview

A method and apparatus in accordance with one embodiment of the present invention permits a disk drive of a memory subsystem that employs write-back caching to be used in its intended design mode while reducing the risk of lost data associated with the use of write-back caching. One embodiment includes modifying or supplementing software running on one or more host computer's coupled to the disk drive. The host software coordinates the communication of input/output (I/O) requests from the host computer to the disk drive, which are typically generated by application programs running on the host computer. The host software also receives acknowledgements from the disk drive indicating the completion of each of the write requests. As previously discussed, a disk drive employing write-back caching generates an acknowledgement for a given write operation as soon as the data and the disk target address specified by the write operation are stored in the write cache. The host then passes each of the acknowledgments to the respective application program originating the request being acknowledged. In one embodiment, the host software is modified or supplemented to delay passing the acknowledgements to the originating application programs until the data specified by the write operation being acknowledged is actually stored on the disk media of the disk drive.

Delaying receipt of a write acknowledgement by an application until data is actually committed to disk accomplishes the goal of preventing corruption of system data in the event data is lost from the cache due to events such as interruption of power. If the application does not ever receive the acknowledgement from the host, the application will recognize that the write was not successfully completed and will perform the necessary recovery from the write error once power is restored.

Simply delaying the acknowledgement from the write-back caching operation until data is actually written to disk, however, may cause the latency of write requests (as perceived by the application that issued the request) to increase significantly and rather unpredictably. This is because in write-back caching schemes, data stored in the cache is not typically written to the disk until the cache is full and entries occupied by the data of previous write requests are required by the disk controller to cache new incoming write requests. Moreover, the decisions regarding which of the entries should be flushed in favor of new write data when the cache is full typically are not strongly correlated to how long the data has been cached. Thus, the perceived latency of each write request from the application's perspective may increase significantly and in an unpredictable manner.

As previously discussed, cached write data also can be flushed from the cache to the disk media using, for example, a software command. A CACHE_FLUSH command is normally available in both ATA and SCSI type hard drives, and is typically initiated from the host. In response, all cache entries containing write data specified by write commands not yet written to the disk are flushed, i.e. the write data they contain is queued up and written to the disk media at a location specified by the cached target address of each write command. In a typical write-back caching scheme, the disk controller identifies these locations by marking them "dirty" whenever data associated with new write commands is first stored in the entries. If the data from such an entry is written to the disk media as a result of a cache flush, the entries are marked "clean" to signify that the disk media now reflects this version of the data at the specified target disk addresses. By issuing the CACHE_FLUSH command periodically, the method and apparatus can avoid the latencies that may otherwise occur by delaying the write acknowledgements until the after the data has been written to disk.

Thus, as the disk drive completes each of the queued write operations to the disk, the disk drive controller marks as "clean" the entry in the cache from which the data for each completed write request is read. Once all of the queued write requests are completed, the disk controller notifies the host software that the cache flush operation is complete. Upon receiving this notification, the host software is then free to pass the write acknowledgements for all of the flushed write requests to their respective originating applications. Using the flush operation ensures that the host is notified because the disk drive controller acknowledges the completed write request. During the flush operation, the write requests may be committed to disk in any order that optimizes the disk access latency, in accordance with known optimization techniques. Those of ordinary skill in the art will recognize that any of the known optimization processes may be readily adapted for use with the various embodiments of the present invention without exceeding the intended scope of the invention. The invention can then balance the increase in throughput achieved by the optimization process against the increase in the perceived latency of each individual request by controlling the number of requests allowed to pool in the cache between CACHE_FLUSH commands.

In another embodiment of the invention, the disk controller rather than the host computer can carry out the method of the invention. In this case the firmware by which the disk controller carries out its typical duties can include instructions to perform the steps of the method. Other than the location of the processor used to carry out the invention, the two embodiments are similar. Those of ordinary skill in the art will recognize that implementing the invention in association the disk controller may require the cooperation of the manufacturer of the disk drive. Moreover, incorporating the method as program instructions within the disk drive(s) of a storage subsystem may forego the benefit of operating the disk controller in the mode for which it was originally designed and characterized.

In another embodiment, the invention may be implemented as program instructions executed by a storage array controller. The storage array controller typically controls access by one or more hosts to a plurality of disk drives of a memory subsystem. The storage array controller knows to which of the disk drives of the subsystem to send a write request generated by a host coupled thereto. Thus, it is also in a position to delay the acknowledgement of write commands issued by any of the disk drives of the memory subsystem until such time as the write data is committed to the disk media. The storage array controller would then be programmed to monitor the pool size of each of the disk drive caches and would issue CACHE_FLUSH commands to each of the disk drives when the appropriate pool size for each was reached in the manner discussed below.

Structure

Figure 1A:
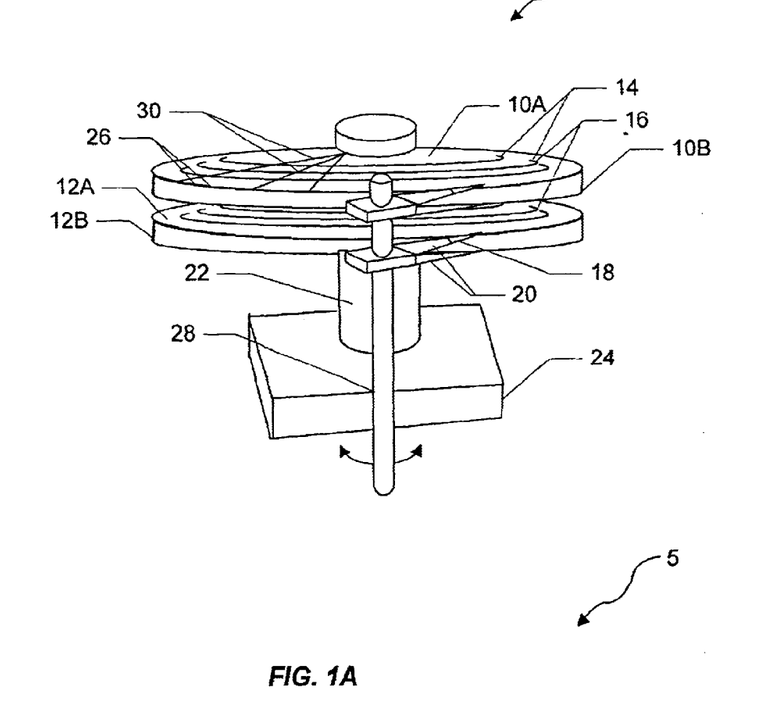
FIGS. 1A and 1B conceptually illustrate the mechanical components of a typical disk drive of a memory subsystem.
Figure 1B:
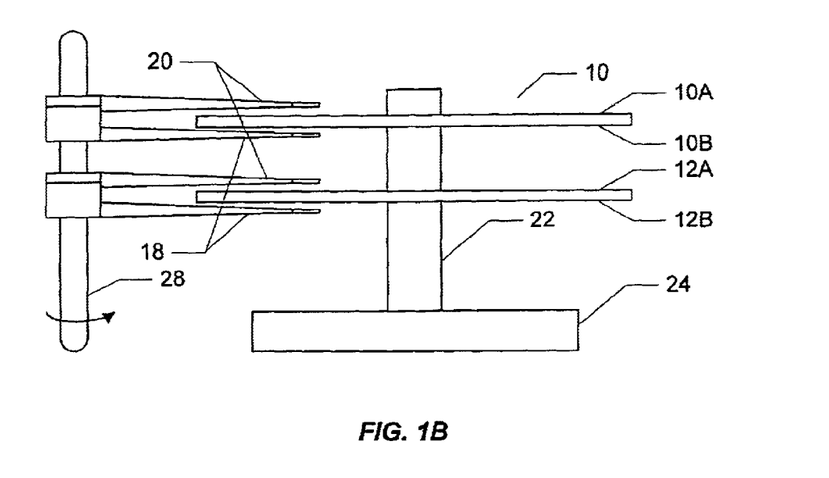

Most current disk drive designs, as generally illustrated by the perspective and side views of FIGS. 1A and 1B respectively, employ stacked multiple platters (thin metal disks) 10a, 10b that are spun at high speed about a spindle 22 by a spindle motor 24. Typically, both surfaces (10A, 10B, 12A, 12B) of the platters are coated with magnetic material upon which data is stored as tiny magnetized spots. A dedicated read/write head 18 flies over each surface of the platters to either detect the magnetized spots during the reading process or create them during the writing process. Each head 18 is typically coupled through an arm 20 to a common actuator that radially moves all of the heads in unison radially between the spindle 22 and the outside edges of the platters (10a, 10b). Thus, all of the heads 18 occupy identical radial positions with respect to the spindle 22 and the outside edge of the platters 10a, 10b.

Data is stored on the platter surfaces (10A, 10B, 12A, 12B) in long concentric rings called tracks 14. The tracks 14 are organized into sectors 26 by sector boundaries 30, with each sector 26 storing a fixed amount of data (typically 512 bytes). Typically, each sector 26 is further subdivided into blocks of data, the locations of which are identified by a disk address consisting of three numbers corresponding to a surface or head of the disk drive, a track or cylinder, and a sector. The surface number indicates a particular surface of a particular platter. The track number indicates the relative position of the particular track with respect to the center of the platter. The sector number identifies the particular sector within the track on which the data resides or will be written.

Because the read/write heads 18 all occupy the same track 16 on their respective surfaces at any given time, that set of tracks 16 corresponds to a cylinder. Data is organized by the host computer system into cylinders such that when one track becomes full, only the head selection need be electronically switched (to a different surface) to continue writing contiguous data, rather than having to seek another track 14 on the same platter. The first sectors of each track 14 are typically staggered with respect to one another so that movement to an adjacent track (and therefore to an adjacent cylinder) from the end of the previous track can be made without rotational delay.

A disk drive typically includes a disk controller to coordinate the transfer of data between a host computer and the disk media. The disk controller typically includes a microprocessor coupled to a memory in which the software instructions are stored that instruct the disk controller how to perform its various functions. The processor is also coupled to a host computer interface and a disk drive interface. The two interfaces, through the disk controller's microprocessor, typically utilize the same interface protocol. As previously discussed, the most common of these protocols are the Intelligent/Integrated Drive Electronics (IDE) interface (which is synonymous with and governed by the Advanced Technology Attachment (ATA) disk drive interface standard), the Small Computer System Interface Standard (SCSI) and the Fibre Channel standard.

Read or write request by the system host computer the request are typically received by the disk controller and queued for access to the disk. Based on the disk address specified by the request, the disk controller facilitates the selection and location of the appropriate read/write head 18 directly over the location from which the data is to be read or to which the data is to be stored respectively. This process first requires that the correct head 18 be electronically selected based on the surface number of the disk address. Second, the correct head 18 (as well all of the other heads 18 by default) must then be located over the correct track 14, which requires acceleration, deceleration and stabilization of the arm 20 over the track based on the track number (a process called seeking). Third, the process must wait for the platter's rotation to bring the correct sector 26 directly under the head 18, based on the sector number of the disk address (called rotational delay). Finally, the process involves the transfer of blocks of data from or to the platter 10, 11 at the appropriate points within the sector 26. The total time required for all of the foregoing steps is equal to the mechanical latency of a disk access.

Figure 2:
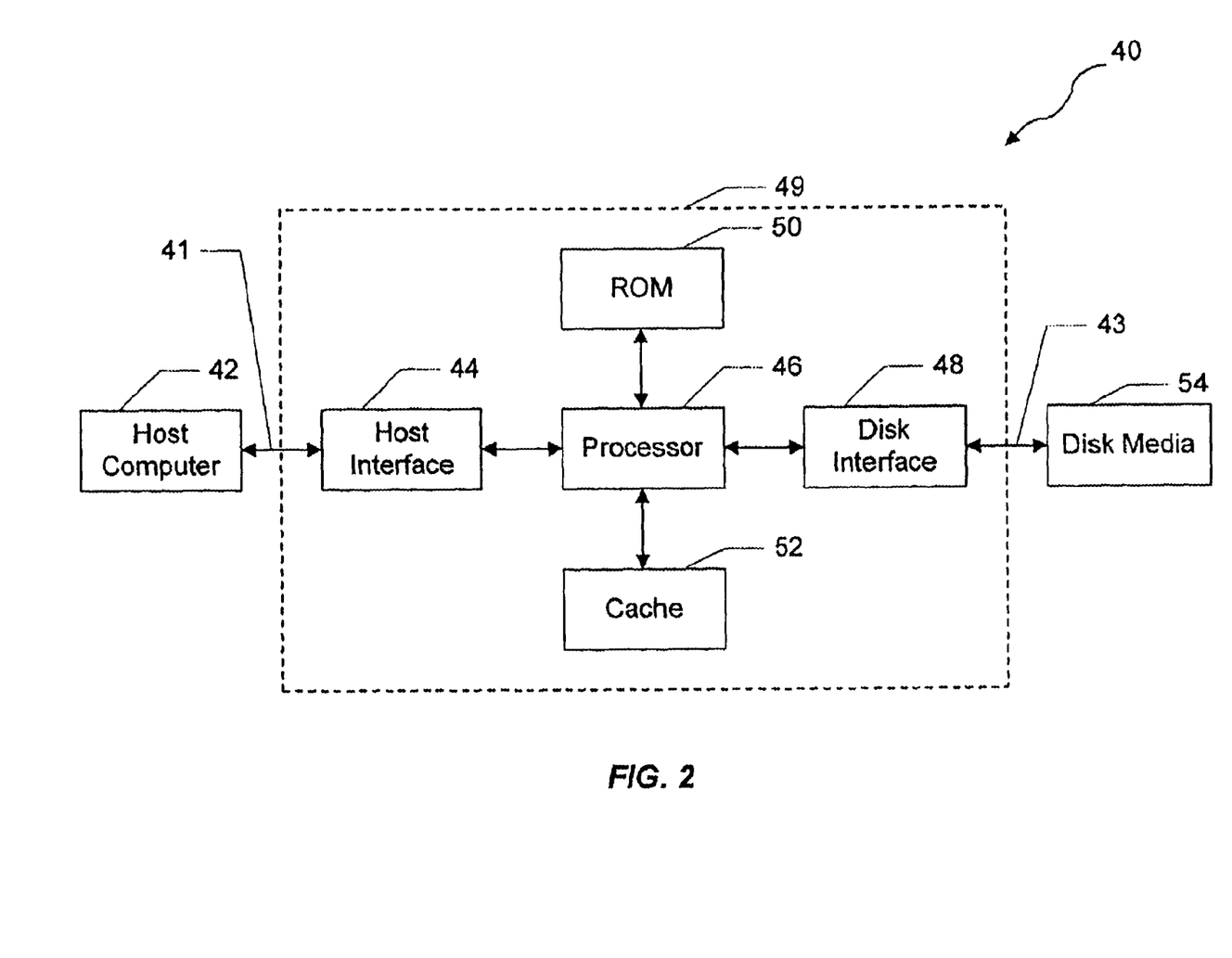
FIG. 2 shows a conceptual block diagram of the relationship between the disk controller, the host computer and the disk media of a disk drive.

FIG. 2 is a simple conceptual block diagram illustration of the relationship between a host computer 42 and a disk drive 40 comprising a memory subsystem to which the host is coupled. Those of ordinary skill in the art will recognize that the storage subsystem may comprise two or more disk drives 40, such as in a memory subsystem employing a RAID (Redundant Array of Independent Disks) configuration. For such an arrangement, host 42 would likely be coupled to a storage array controller (not shown) which would in turn be coupled to the two or more disk drives 40. The storage array controller would control access by the host to the two or more disk drives 40. Moreover, those of ordinary skill will also recognize that two or more hosts may be coupled to disk drive(s) 40 of the memory subsystem, in which case the two or more hosts 42 typically would be coupled to the memory subsystem by way of a shared network, e.g., a LAN, WAN, intranet, or even the Internet. The network would then provide the protocol by which the hosts would take turns accessing the memory subsystem over the network connection.

Disk drive 40 includes a disk controller 49 that, among other tasks, coordinates the processing of read and write accesses to the disk media 54 and the host 42. Host interface 44 provides a means by which the disk controller 49 communicates with the host software running on the host computer 42 employing one of the previously described standard disk drive interfaces over host bus 41. In the case where multiple hosts 42 share access to the memory interface, host bus 41 is a network connection that establishes a protocol by which the two or more hosts 42 access the disk drive 40. In the case where the memory subsystem comprises more than one disk drive 40, the storage array controller is inserted between the host interface of each of the disk drives 40, and the host bus 41.

Disk interface 48 provides a means by which the disk controller 49 can communicate with disk media 54. The disk controller 49 includes a processor 46 that coordinates the transfer of control and data signals between the host 42 and the disk media 54 over interface bus 43. The firmware that dictates to processor 46 how to process the incoming requests is stored in ROM 50. The processor 46 can be any processor commonly used for embedded applications, and ROM 50 can be separate from processor 46 or integrated therewith.

The disk controller 49 can also maintain an incoming request queue (not shown) into which write requests received from the host 42 through interface 44 are temporarily stored in a first-in-first-out (FIFO) manner. One or more instructions remain pending until the processor 46 is ready to process the requests in accordance with well-known write-back caching techniques familiar to those of skill in the art. Processor 46 is also coupled to cache memory 52, so that it can store the write request data into, and retrieve the same data from, the cache 52. Processor 46 can also handle the maintenance of the cache directory identifying the particular write requests stored therein and in which entries they are stored. Cache 52 can also be used to store read request data.

Disk controller 49 may also include an output request queue (not shown) into which write (and read) operations may be temporarily stored pending their execution to access the disk media 54. An alternative would be for the requests to be issued to the disk directly from the cache in a predetermined order. Either way, the order in which the requests are committed to disk can be optimized using techniques familiar to those of skill in the art and that are currently employed in commercially available disk drives.

In performing typical write-back caching, the disk controller 49 issues the next write request from its incoming request queue, storing the data associated with the write request in an available location in the cache. The data is then marked "dirty" by the disk controller. This can be accomplished by maintaining a directory that reflects the status of all of the entries of the cache. The target address is also stored in association with the data. The disk controller then automatically issues, for the write request just cached, a write acknowledgement back to the host software through host interface 44.

When a CACHE_FLUSH command is issued, the disk controller 49 knows to queue all of those write requests to disk that are stored in those entries of the cache marked "dirty." Also in accordance with known write-back caching techniques, once the data has been written to disk from a cache entry, the entry is then marked "clean." As is know in the art, the disk controller can maintain the cache directory by way of a separate data structure in which it keeps track of which write requests are stored in the cache as well as whether the data is clean or dirty. An alternative is to provide bits within the cache entry by which to mark the data as "clean" or "dirty", and to use an address and tag field by which to perform matches to determine a cache hit or miss. These and alternative methods for tracking the "clean" and "dirty" status of cached write requests will be readily understood by those of ordinary skill in the art.

The host computer 42 can operate with known operating system software, which handles administrative activities such as I/O for one or more applications running on the host computer. The applications pass read and write requests to the host software in host computer 42, and the host software handles the communications with the disk drive 40 of the memory subsystem through host interface 44 to coordinate the requests. In write-back caching as previously discussed, the disk controller 49 of disk drive 40 issues an acknowledgement to the host 42 through host interface 44 indicating that a write request is completed as soon as it is stored in cache 52. The host software than passes the acknowledgement to the application that originated the request being acknowledged. In normal write-back caching, this permits the application to continue processing without regard to whether the data has actually been stored on the disk media 54 of disk drive 40.

In one embodiment, the method of the invention is realized as executable code that can be integrated as part of the software running on the host 42. In this embodiment, the method of the invention may operate from outside of the memory subsystem to alter the interaction between the applications running on the host 42 and the disk drive(s) 40 of the memory subsystem to realize the benefits of the invention. The host software is first modified to delay passing acknowledgements to the applications for their write requests until the application is informed that the write requests have been written to disk media 54 of disk drive 40. To force the write-back caching scheme to write instructions to the disk media 54, it may issue CACHE_FLUSH commands on a regular basis to the disk drive 40. Disk controller 49 handles the flush process in due course as it always would, by queuing all "dirty" write requests for commitment to the disk media 54.

Known optimization techniques may then be applied in ordering these cached write requests for commitment to the disk media 54 to minimize the cumulative disk media 54 access latency for the flushed cached requests. The host software waits until the disk controller notifies it that the cache flush process has successfully completed for all cached write requests. At that time, the host software passes the acknowledgements for all of the cached write requests written to the disk media during the just completed flush to their originating applications.

In another aspect of the invention, the host software monitors the stream of requests it receives from the applications running on the host 42 to determine the optimal number of requests to pool in the cache between CACHE_FLUSH commands. The host 42 maintains an incoming request queue in which to store write requests and to observe the nature of the incoming request stream. In some embodiments, the host issues one request at a time to the disk drive(s) of the memory subsystem, and waits until it receives the acknowledgement back from the disk drive 40, indicating that the write request has been cached, before issuing the next. These embodiments can therefore utilize the disk drive 40 unaltered from any of its normal modes of operation.

In another embodiment, the invention can be implemented as executable code integrated as part of the firmware that is stored in ROM 50. In this embodiment, the disk controller 49 is operated to delay sending write acknowledgements to the host until write requests are actually stored on the disk media 54. The disk controller can be further programmed to initiate the cache flush process by which to force data to be written to the disk media 54 on a regular basis. In this embodiment, the disk controller monitors the incoming request stream as sent by the host to ascertain an optimal number of requests to be pooled in the cache between cache flushes. For this embodiment, the disk drive operation is altered, and likely requires the cooperation of the disk drive manufacturer.

In either of the foregoing embodiments, the invention maintains an incoming request queue as a FIFO type data structure that can be realized either virtually or as circuitry. The incoming requests from the applications are either stored in the incoming request queue as received from the host (where implemented with the disk controller), or they are queued as received by the host software from the application (when implemented as part of the host software). The invention can be essentially implemented as executable code in association with a microprocessor or microcontroller whether located within the host(s) 42, the disk drive(s) 40 of the memory subsystem, or therebetween, such as in the case of the aforementioned storage array controller.

Methodology

In one embodiment, the risk of lost or unrecoverable data is reduced by delaying the acknowledgement of write requests to the originating applications running on the host computer until data has actually been stored on the disk media. As previously discussed, however, delaying the acknowledgement to the applications of write requests in a write-back caching scheme until written to disk could create unacceptably long and unpredictable latencies for those write operations. As previously discussed, in write-back caching the requests remain cached and are typically not written to the disk media (and therefore acknowledged) until room occupied by the request in the cache is needed to store another request. Moreover, the algorithms used to determine which request or requests are flushed as a result of a cache miss when the cache is full vary, and will not necessarily flush those requests which have been cached the longest. A more deterministic way to cause cache write data to be written to the disk media is to flush the cache by issuing a CACHE_FLUSH instruction.

Thus, in accordance with embodiments of the invention, acknowledgements are withheld from applications as generated during the write-back caching of their write requests, and a CACHE_FLUSH instruction is issued on a regular basis to cause those cached write operations to be completed to disk so that they can still be acknowledged to the host in a reasonable period of time. At one extreme, a CACHE_FLUSH instruction could be issued immediately after each write operation has been cached. Under this scenario, however, as the rate of incoming write requests received by the incoming request queue increases beyond the limited throughput available when processing the requests on such a serial basis, the latency of the requests will increase as they wait in the incoming request queue to be processed. Thus, as the disk drive becomes busier addressing write requests, the throughput of writes to disk must increase to handle the increased rate of requests. This is accomplished by permitting the number of requests pooling in the cache to increase. In a sense, the requests that would be pooling in the incoming request queue are now permitted to pool in the cache instead.

As the pool size increases, the opportunity for optimization in throughput should increase, and will vary depending upon how related or even sequential I/O operations are. At some point, the law of diminishing returns may set in. The upper limit of the pool size can be determined by the point at which any incremental increase in throughput realized through the addition of another instruction to the pool can no longer offset the incremental increase in the perceived latency of each request resulting from pooling the additional request. The optimal pool size is dependent on variables involving the nature of the request stream as it arrives from the host. The nature of the request stream may vary considerably with time, including the rate at which the requests are being generated by the applications running on the host and how related they are to one another. Three embodiments of the method of the invention are now discussed with reference to FIGS. 3–5, which can provide a reasonable approximation for determining an optimal pool size.

Figure 3:
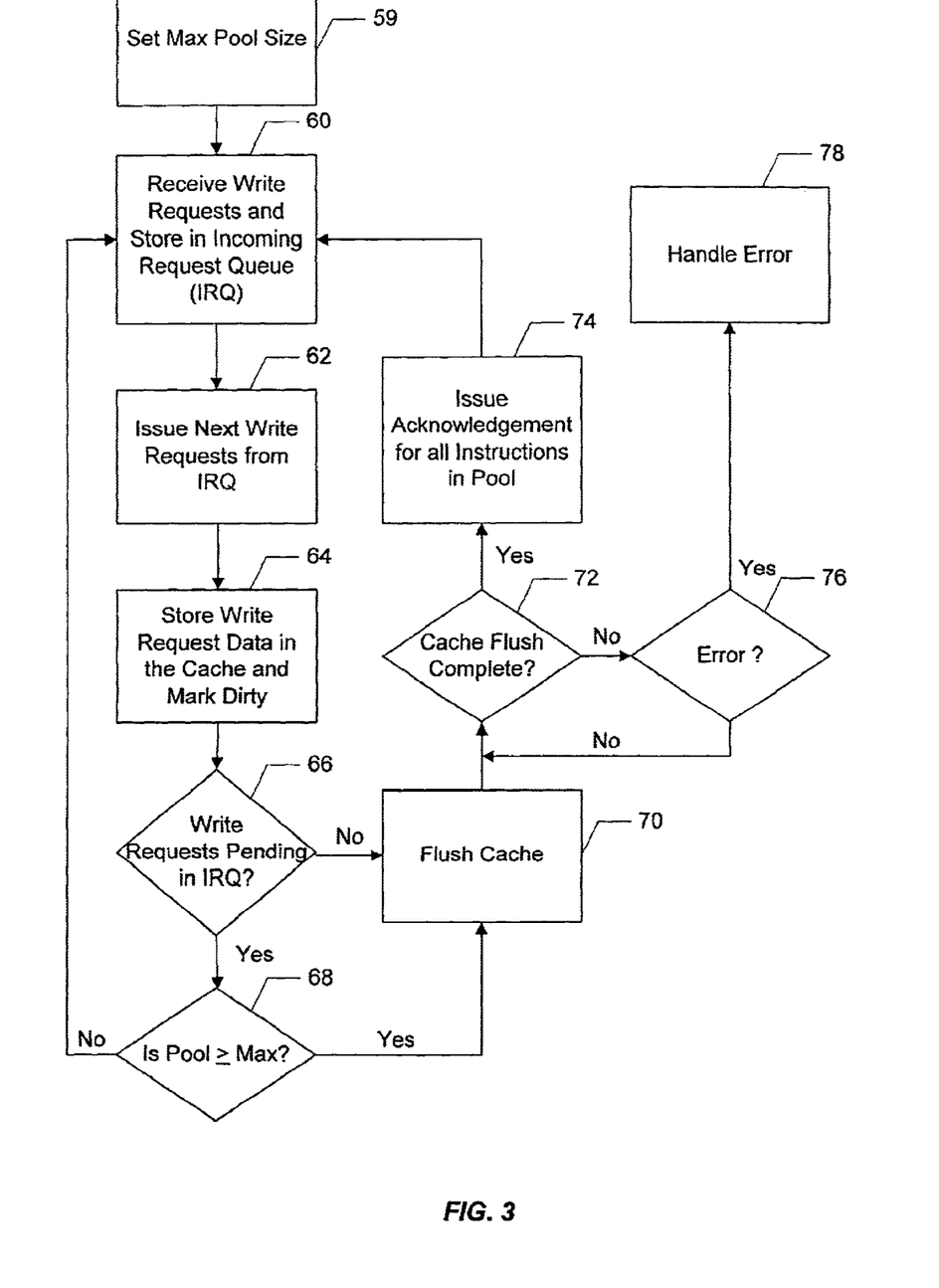
FIG. 3 illustrates a procedural flow diagram for one embodiment of the invention.

With respect to FIG. 3, one embodiment of the method of the present invention is described. At processing step 59, a maximum pool size is initially established. This number can be established through experimentation for a particular application. For example, a maximum pool size of 4–5 requests was found to be a reasonable compromise between possible types of applications. At processing step 60, write requests are received from applications running on the host computer and maintained in an incoming request queue on a first-in-first-out (FIFO) basis. At processing step 62, the oldest write request pending in the incoming request queue is issued for cache write-back processing by the disk controller (49, FIG. 2). At processing step 64, the disk controller stores the address and data associated with the issued write request in the write cache in accordance with standard write-back caching practice (this includes marking the cache entry "dirty"). At decision step 66, it is determined whether any further write requests are currently pending in the incoming request queue. If there are, processing continues at decision step 68, where it is ascertained whether the total number of write requests that have been cached is equal to or exceeds the predetermined maximum pool size as established in step 59. If the answer to decision block 68 is "no," processing continues at step 60 wherein processing continues through steps 60, 62, 64, and 66 as previously described. When processing reaches decision block 66 again, if the answer is "yes," processing again continues at decision block 68. This sequence of steps continues to repeat until either a "no" is generated at decision block 66 or a "yes" is generated at decision block 68.

If either of the two foregoing decisions are reached, a CACHE_FLUSH command is issued to the disk controller, which causes all of the write requests currently stored in the cache and marked "dirty" to be queued for completion to the disk media. Proceeding to decision block 62, processing continues as all of the current pool of cached write requests is committed to disk. The flush process is monitored for write errors as indicated by decision block 76, and the flush process continues as long as no error is detected. If a write error occurs during the flush process, error recovery occurs at processing block 78 in accordance with error recovery techniques familiar to those of skill in the art and employed in current disk drive designs. Processing continues at step 72 until all of the cached write requests in the current pool have been written to the disk. Optimization techniques as implemented in the design of the memory subsystem may be employed during the flushing process to minimize the cumulative access latency required to commit the pool of requests to disk. Once all pooled write requests are completed, the entries in which they previously resided are marked clean, and processing continues at step 74 where the disk controller issues a notification to the host that the cache flush process has been successfully completed. At this time, acknowledgements for all of the write requests written to disk during the flush process are provided to their originating applications. Processing then continues at block 60 where additional write requests can be received at the incoming request queue.

Thus, in this embodiment whichever processor is used to implement the invention (i.e. the host processor or the disk controller), uses the fact that another write request was already pending in the incoming request queue upon caching the previous request. Thus, instructions are permitted to pool as long as another write request is pending, up until the pool size reaches the predetermined maximum. While the optimal maximum pool size will vary depending upon the nature of the incoming request pool, data from use of these systems indicates that a maximum of four or five seems to work well.

Figure 4:
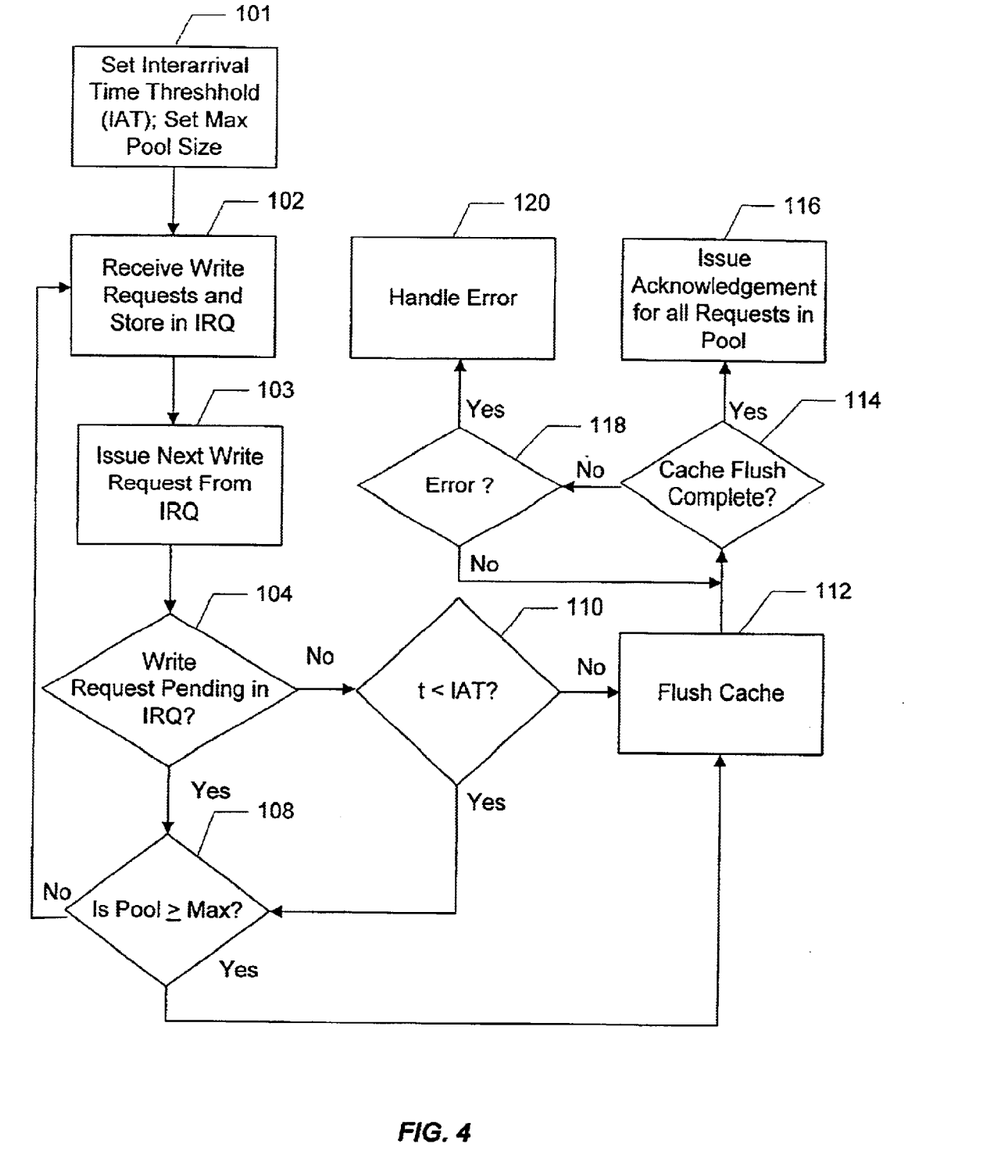
FIG. 4 illustrates a procedural flow diagram for one embodiment of the invention.

A second embodiment of the method of the present invention is described with respect to FIG. 4. At processing block 101, an interarrival time threshold is set (IAT) which defines the maximum time permitted between the arrival of write requests before a CACHE_FLUSH command is issued. Put another way, if a request is cached and no other requests are pending, and if the processor has to wait longer than the IAT for another request to arrive in the incoming request queue, the cache will be flushed. Also at processing block 101, a maximum pool size is set to ensure that even under the busiest of conditions, the pool size is eventually limited. Again, a pool size of 4–5 has been found to be a good compromise, but empirical data for a given application may be the most optimal way to determine the ideal maximum pool size.

Continuing at processing step 102, write requests are received from the applications running on the host and maintained in the incoming request queue. At processing step 103, the next write request pending in the incoming request queue is issued for write-back cache processing by the disk controller. Processing continues at decision step 104, where it is determined whether any requests are pending in the incoming request queue. If the answer is yes, processing continues at decision step 108, where it is determined whether the total number of write requests that are currently pooled in the cache exceeds the maximum number of requests as set in processing step 101. If the answer to this determination is "no," processing continues at processing step 102 where one or more write requests may be received from applications. Processing continues again at processing step 103, where the next pending instruction in the incoming request queue is issued for caching. These steps are repeated until either a "no" determination is generated by decision step 104 or a "yes" determination is generated at decision step 108.

If a "no" is generated at decision step 104, processing continues at decision step 110, where it is determined whether the time between the previously issued write request and the next write request to arrive at the incoming request queue is less than the predetermined interarrival time threshold as set in processing step 101. If the answer to this determination is "yes," processing continues at step 108, where it is determined whether the maximum pool size has been met or exceeded. If the answer is no, processing continues at step 102 where the next write request pending in the incoming request queue is issued to the disk controller. Processing then continues from there as previously described. If the answer to the determination made at decision step 110 is "no," a CACHE_FLUSH command is issued and all of the write requests currently pooled in the cache are queued to be written to the disk media. Likewise, if at any time the determination at decision step 108 is that the number of pooled write requests equals or exceeds the maximum pool size as set during processing step 101, this will also lead to the issuance of a CACHE_FLUSH command to the disk controller. Processing then continues as previously described during and after the flushing process.

Figure 5:
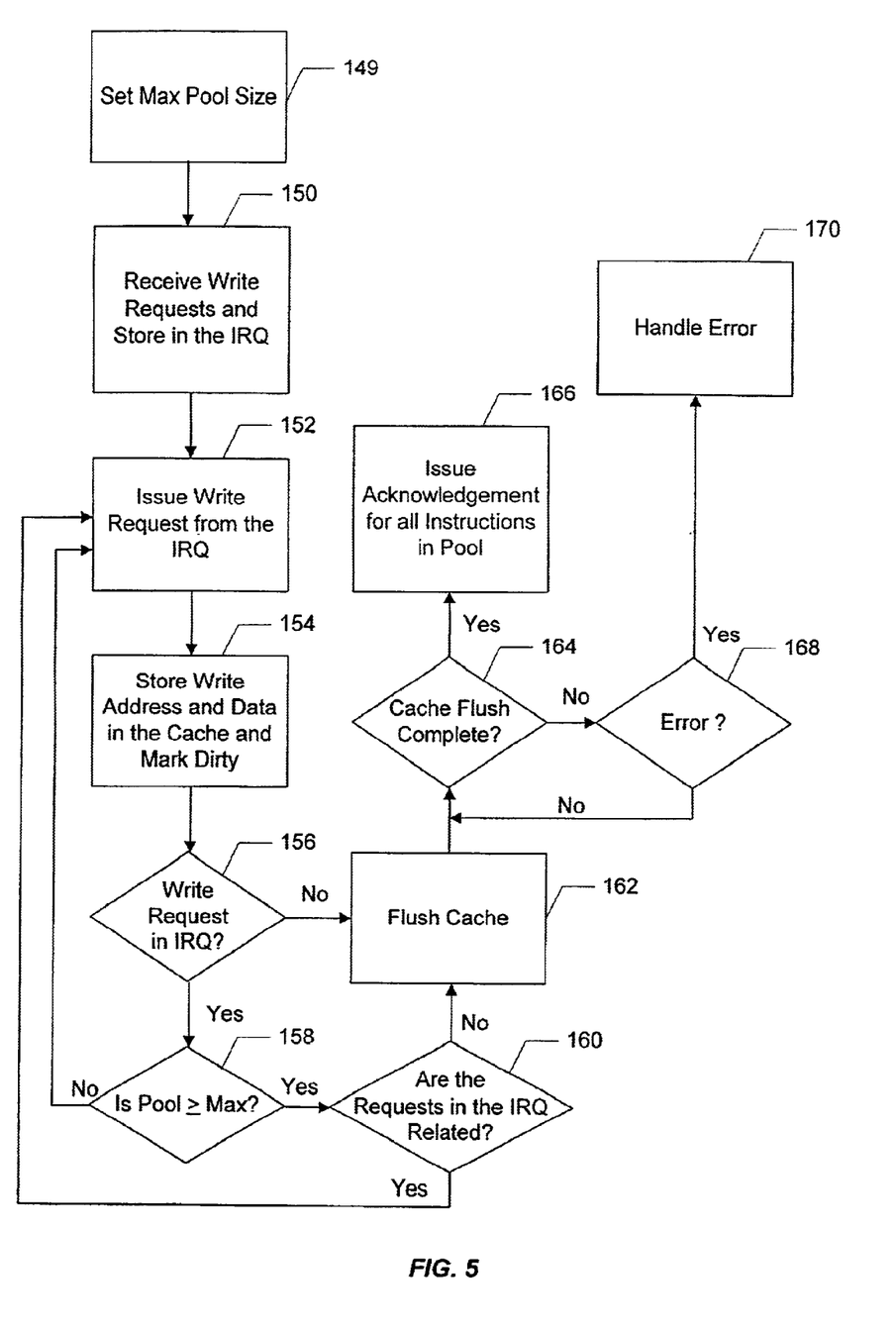
FIG. 5 illustrates a procedural flow diagram for one embodiment of the invention.

Another embodiment of the method of the invention is described with respect to FIG. 5. At processing step 149, a maximum number of write requests for a pool is defined as the maximum pool size. Continuing at processing step 150, write requests from applications running on the host are received and maintained in the incoming request queue. Continuing at processing step 152, the next write request pending in the incoming request queue is fetched by the disk controller for processing. At processing block 154, the write request data is stored in the cache and its address is maintained by the disk controller in accordance with techniques familiar to those of skill in the art. The cache entry it resides in is marked "dirty." Processing continues at decision step 156, where it is determined whether there are additional write requests pending in the incoming request queue. If the answer to that determination is "yes," processing continues at decision step 158 where it is determined whether the number of write requests currently pooled in the cache equals or exceeds the maximum as set in processing block 149. If the answer to this determination is "no," processing continues at processing step 152 where in the next write request pending in the incoming request queue is issued to the disk controller. Processing then continues as previously described until either a "no" is generated at decision step 156 or a "yes" is generated at decision step 158.

If a "no" determination is generated at decision step 156, a CACHE_FLUSH command is issued as denoted by processing block 162. Cache flush processing continues thereafter in the same manner as described previously with regard to the previous embodiments. If a "yes" determination is generated at decision block 158, processing continues at decision step 160 where a determination is made regarding the degree to which write requests still pending in the incoming request queue are related to one another. Thus, if the write requests currently pending in the incoming request queue are continuous writes or at least very closely related in terms of disk address proximity, a "yes" determination is generated at decision step 160 which overrides the maximum pool size as determined at decision step 158. A "yes" determination at decision step 160 causes processing to continue at processing block 152 where the next write request is issued to the disk controller. The process then continues as previously described until a "no" is generated at decision step 160, in which case a CACHE_FLUSH command is issued as denoted by processing step 162. Once again, the cache flush process is conducted in the same manner as previously described.

In this embodiment, the invention establishes a maximum pool size, which can be overridden by a determination that the write requests still pending in the incoming request queue are so related that the increase in throughput is still sufficient to beneficially offset the latency created by increasing the pool size.

Those of skill in the art will recognize that the embodiments of the methods of the present invention as illustrated in FIGS. 3 through 5 can be implemented as executable code that could be executed either by the host computer(s), by the disk controller(s), or by a processor between the host and the disk drive, such as an array processor used to coordinate communications between multiple disk drives of a memory subsystem and one or more hosts. Whichever processor is used to execute the invention, it may maintain the write requests in the incoming request queue, issue write requests from the incoming request queue to the disk controller, and initiate the CACHE_FLUSH process when the appropriate pool size has been reached. The executing processor may also make the determinations as to whether write requests are still pending in the incoming request queue, whether the maximum pool size has been reached or exceeded, and whether the write requests pending in the incoming request queue are related and to what degree. It may also delay communicating the acknowledgements back to the originating applications after the data is written to disk media, based on receipt of notification from the disk drive that the cache flush process has been completed.

The disk controller may perform the write-back cache processing steps of storing the write request information in the cache, marking the cache entry "dirty" and conducting the cache flush process as previously described. If the disk controller is also used to execute the code to perform all of the steps of the invention, the disk controller may be the processor maintaining the incoming request queue, making the decisions with respect to continued pooling of write requests, as well as performing the processing that occurs typically with respect to write-back caching operations in the memory subsystem. The primary difference between two such embodiments is that the disk controller will withhold acknowledgements from the host until the cache flush process has been successfully completed.

The above embodiments illustrate but do not limit the invention. In particular, the invention is limited by neither the types nor makes of memory subsystems nor the types of computers used as hosts. Other embodiments and variations are within the scope of the invention, as defined by the appended claims.

What is claimed is:

1. A method of processing a series of write requests originated by one or more applications running on one or more host computers coupled to a memory subsystem, the series of write requests comprising data to be written to storage media comprising the memory subsystem, said method comprising the steps of:
    pooling one or more of the series of write requests in a write cache of the memory subsystem;
    delaying communication of write acknowledgements generated by the memory subsystem for each of the write requests comprising a current pool until the data of all of the pooled requests has been written to the storage media; and
    flushing the cache, when the current pool reaches the appropriate size, to store the data of all of the write requests comprising the current pool to the storage media.

2. The method of claim 1 wherein said step of pooling is performed in accordance with a write-back caching process.

3. The method of claim 1 wherein said step of flushing the cache is initiated through one more software commands.

4. The method of claim 1 wherein the memory subsystem comprises one or more disk drives and the storage media comprises one or more magnetic disks.

5. The method of claim 4 wherein the write cache is located in the one or more disk drives.

6. The method of claim 1 wherein said method further comprises the step of monitoring the series of write requests to determine the appropriate pool size for a current pool.

7. The method of claim 6 wherein said monitoring step further comprises the steps of:
    maintaining the write requests received from the applications in an incoming request queue;
    determining whether a write request is pending in the incoming request queue;
    determining whether a predetermined maximum pool size has been met or exceeded by the current pool;
    issuing a next write request pending in the incoming request queue to be processed by said pooling step if a request is pending and the predetermined maximum pool size has not been met or exceeded by the current pool; and
    otherwise proceeding to said step of flushing the cache.

8. The method of claim 7 wherein said monitoring step further comprises the steps of:
    assessing the degree to which any write requests pending in the incoming request queue are related to those already comprising the current pool; and
    wherein said issuing step further comprises the step of permitting the maximum pool size to be exceeded when any pending write requests are assessed to be sufficiently related to those write requests already comprising the current pool.

9. The method of claim 8 wherein said assessing step further comprises the step of determining that the write requests are sufficiently related if they are continuous with one another or continuous with one or more of the write requests already comprising the current pool.

10. The method of claim 8 wherein said assessing step further comprises the step of determining that the write requests are sufficiently related if the disk addresses of one or more of the pending requests are within some predetermined range of one or more of the requests already comprising the current pool.

11. The method of claim 7 wherein said monitoring step further comprises the steps of:
    waiting a predetermined time for a write request to be received by the incoming request queue whenever no write requests are determined to be pending in the incoming request queue and the predetermined maximum pool size has not been met or exceeded by the current pool; and
    otherwise proceeding to the step of flushing the cache.

12. The method of claim 7 wherein said step of pooling is performed in accordance with a write-back caching process and said step of issuing a next write request further comprises the step of delaying the issuing of the next write request until the write-back caching process has been completed for a most recently issued write request.

13. The method of claim 7 wherein the predetermined maximum pool size is four to five write requests.

14. The method of claim 1 wherein said step of flushing the cache further comprises arranging the order in which each request in the current pool is written to the storage media to minimize the time required to perform said step of flushing the cache.

15. The method of claim 1 wherein said step of flushing the cache further comprises the step of identifying the write requests comprising the current pool as those stored in write cache entries marked dirty.

16. The method of claim 1 wherein said step of delaying communication further comprises the step of communicating the write acknowledgements for each of the write requests comprising the current pool to each of the originating one or more applications upon receiving a notification from the memory subsystem that the flushing process has been completed.

17. The method of claim 1 wherein said steps of pooling, delaying, monitoring and issuing are performed by software residing in association with the host computer.

18. The method of claim 1 wherein said steps of pooling, delaying, monitoring and issuing are performed by software residing in association with a disk controller of the memory subsystem.

19. The method of claim 1 wherein said steps of pooling, delaying, monitoring and issuing are performed by software residing in association with an array processor of the memory subsystem.

20. The method of claim 1 wherein two or more hosts are coupled to the memory subsystem using a network.

21. The method of claim 20 wherein the network is a shared network.

22. A computer system for processing a series of write requests originated by one or more applications running on one or more host computers coupled to a memory subsystem, the series of write requests comprising data to be written to storage media in the memory subsystem, said computer system comprising:

a memory means for storing program instructions for:

pooling one or more of the series of write requests in a write cache of the memory subsystem;

delaying communication of write acknowledgements generated by the memory subsystem for each of the write requests comprising a current pool until the data of all of the pooled requests has been written to the storage media; and flushing the cache, when the current pool reaches the appropriate size, to store the data of all of the write requests comprising the current pool to the storage media; and means for processing said program instructions.

23. The computer system of claim 22 wherein said pooling is performed in accordance with a write-back caching process.

24. The computer system of claim 22 wherein said flushing the cache is initiated through one more software commands.

25. The computer system of claim 22 wherein the memory subsystem comprises one or more disk drives and the storage media comprises one or more magnetic disks.

26. The computer system of claim 25 wherein the write cache is located in the one or more disk drives.

27. The computer system of claim 22 wherein said program instructions are further for monitoring the series of write requests to determine the appropriate pool size for a current pool.

28. The computer system of claim 27 wherein said program instructions are further for:

maintaining the write requests received from the applications in an incoming request queue;

determining whether a write request is pending in the incoming request queue;

determining whether a predetermined maximum pool size has been met or exceeded by the current pool;

issuing a next write request pending in the incoming request queue to be processed by said pooling step if a request is pending and the predetermined maximum pool size has not been met or exceeded by the current pool; and otherwise proceeding to said step of flushing the cache.

29. The computer system of claim 28 wherein said program instructions are further for:

assessing the degree to which any write requests pending in the incoming request queue are related to those already comprising the current pool; and wherein said issuing step further comprises the step of permitting the maximum pool size to be exceeded when any pending write requests are assessed to be sufficiently related to those write requests already comprising the current pool.

30. The computer system of claim 29 wherein said program instructions are further for determining that the write requests are sufficiently related if they are continuous with one another or continuous with one or more of the write requests already comprising the current pool.

31. The computer system of claim 29 wherein said program instructions are further for determining that the write requests are sufficiently related if the disk addresses of one or more of the pending requests are within some predetermined range of one or more of the requests already comprising the current pool.

32. The computer system of claim 28 wherein said program instructions are further for:

waiting a predetermined time for a write request to be received by the incoming request queue whenever no write requests are determined to be pending in the incoming request queue and the predetermined maximum pool size has not been met or exceeded by the current pool; and otherwise proceeding to the step of flushing the cache.

33. The computer system of claim 28 wherein said step of delaying communication further comprises the step of communicating the write acknowledgements for each of the write requests comprising the current pool to each of the originating one or more applications upon receiving a notification from the memory subsystem that the flushing process has been completed.

34. The computer system of claim 28 wherein said pooling is performed in accordance with a write-back caching process and said issuing a next write request further comprises the step of delaying the issuing of the next write request until the write-back caching process has been completed for a most recently issued write request.

35. The computer system of claim 22 wherein two or more hosts are coupled to the memory subsystem using a network.

36. The computer system of claim 35 wherein the network is a shared network.

37. The computer system of claim 22 wherein said flushing the cache further comprises arranging the order in which each request in the current pool is written to the storage media to minimize the time required to perform said step of flushing the cache.

* * * * *